United States Patent [19]
Mehring

[11] Patent Number: 5,675,729
[45] Date of Patent: Oct. 7, 1997

[54] METHOD AND APPARATUS FOR PERFORMING ON-CHIP MEASUREMENT ON A COMPONENT

[75] Inventor: Peter Arnold Mehring, Sunnyvale, Calif.

[73] Assignee: Sun Microsystems, Inc., Mountain View, Calif.

[21] Appl. No.: 699,199

[22] Filed: Aug. 19, 1996

Related U.S. Application Data

[63] Continuation of Ser. No. 142,505, Oct. 22, 1993, abandoned.

[51] Int. Cl.$^6$ .................................................. G06F 11/30
[52] U.S. Cl. ........................................................ 395/183.13
[58] Field of Search ........................ 395/183.01, 183.06, 395/183.1, 183.11, 183.13, 183.14, 184.15, 183.09, 183.21, 184.01, 375; 324/73.1; 364/474.16, 474.19, 488, 489, 490, 550, 551.01, 579, 580

[56] References Cited

U.S. PATENT DOCUMENTS

| | | | |
|---|---|---|---|
| 4,590,550 | 5/1986 | Eilert et al. | 395/183.21 |
| 4,635,193 | 1/1987 | Moyer et al. | 364/200 |
| 4,821,178 | 4/1989 | Levin et al. | 395/184.01 |
| 4,845,615 | 7/1989 | Blasciak | 364/200 |
| 5,103,394 | 4/1992 | Blasciak | 395/575 |
| 5,157,781 | 10/1992 | Harwood et al. | 395/575 |
| 5,245,638 | 9/1993 | Gustafson | 395/575 |
| 5,329,471 | 7/1994 | Swoboda et al. | 364/578 |
| 5,384,713 | 1/1995 | Kleinfelder | 364/550 |

*Primary Examiner*—Robert W. Beausoliel, Jr.
*Assistant Examiner*—Stephen C. Elmore
*Attorney, Agent, or Firm*—Blakely Sokoloff Taylor & Zafman

[57] ABSTRACT

The system of the present invention includes programmable logic to generate watchpoint traps which cause a branch to determined trap code and breakpoint signals which cause the stopping of the system clock. Furthermore, the system can measure system performance criteria. The logic is flexible and easy to program, but sophisticated in application to provide a variety of criteria that trigger on events which in turn increment the counters. In the preferred embodiment, the system includes two counters and trigger decode logic to increment the counters. Each counter is independently programmable to enable the user to determine such performance information as average latency, which is a combination of one counter counting the number of occurrences of a particular event and a second counter counting the duration of the events. Both counters can be programmed to measure on edges or levels of signals. In addition, the triggers can be used in a cascaded structure, wherein the first counter is used to generate a trigger which may be further qualified by the second counter. Using this implementation, a more flexible counting strategy is provided. Furthermore, by using the two counters in a cascaded fashion, the occurrence on one type of event can be used to monitor the occurrence of a second type of event in order to determine the occurrence of a combination of events. In addition, both watchpoint traps and breakpoint signals can be generated based upon the occurrence of a variety of events internal to the component and not easily accessible during execution by the user.

46 Claims, 8 Drawing Sheets

Trigger A select register                                   220   260

| reserved | Trigger A enables | OR | L |
|---|---|---|---|
| 31        27 | 26                          02 | 01 | 00 |

| Bit | Mnemonic | Function |
|---|---|---|
| 00 | L | Trigger on EDGE (L=0) or LEVEL (L=1) |
| 01 | AND | Combine triggers by AND (AND=1) or OR (AND=0) |

Cache triggers
200 {
| 02 | IHLD | I-cache hold trigger |
| 03 | IMSS | I-cache miss trigger |
| 04 | ISTRM | I-cache stream trigger |
| 05 | IFTCH | I-cache fetch (cache lookup) |
| 06 | DHLD | D-cache hold trigger |
| 07 | DMSS | D-cache miss trigger |
| 08 | DSTRM | D-cache stream trigger |
| 09 | DFTCH | D-cache fetch (cache lookup) |
| 10 | WBHLD | Write buffer hold trigger |

Memory triggers
210 {
| 11 | MBSY | Memory interface busy trigger |
| 12 | ABSY | AFX interface busy trigger |
| 13 | MPAGE | Memory page mode access trigger |
| 14 | MPRCG | Memory precharge access trigger |
| 15 | MRMW | Memory Read/Modify/Write operation trigger |

System triggers
220 {
| 16 | XLTE | MMU translation attempt trigger |
| 17 | SRTW | SPARC Ref. MMU tablewalk trigger |
| 18 | SUP | Supervisor mode access trigger |
| 19 | VAT | Virtual address trigger |
| 20 | STALL | Processor stall trigger |

FPU triggers
230 {
| 21 | FPHLD | FPU pipeline hold trigger |
| 22 | FPQ | FPU Queue full trigger |

DMA triggers
| 23 | DMAR | DMA request trigger |
240 {
| 24 | DMAT | DMA translate trigger |
| 25 | DMAW | DMA write trigger |

| 26 | CNTB | Counter B carry out trigger |

Trigger B select register 370 360

| reserved | Trigger B enables | OR | L |
|---|---|---|---|
| 31    27 | 26 | 02 | 01   00 |

| Bit | Mnemonic | Function |
|---|---|---|
| 00 | L | Trigger on EDGE (L=0) or LEVEL (L=1) |
| 01 | AND | Combine triggers by AND (AND=1) or OR (AND=0) |

Cache triggers
| | | |
|---|---|---|
| 02 | IHLD | I-cache hold trigger |
| 03 | IMSS | I-cache miss trigger |
| 04 | ISTRM | I-cache stream trigger |
| 05 | IFTCH | I-cache fetch (cache lookup) |
| 06 | DHLD | D-cache hold trigger |
| 07 | DMSS | D-cache miss trigger |
| 08 | DSTRM | D-cache stream trigger |
| 09 | DFTCH | D-cache fetch (cache lookup) |
| 10 | WBHLD | Write buffer hold trigger |

300 brackets rows 02–10

Memory triggers
| | | |
|---|---|---|
| 11 | MBSY | Memory interface busy trigger |
| 12 | ABSY | AFX interface busy trigger |
| 13 | MPAGE | Memory page mode access trigger |
| 14 | MPRCG | Memory precharge access trigger |
| 15 | MRMW | Memory Read/Modify/Write operation trigger |

310 brackets rows 11–15

System triggers
| | | |
|---|---|---|
| 16 | XLTE | MMU translation attempt trigger |
| 17 | SRTW | SPARC Ref. MMU tablewalk trigger |
| 18 | SUP | Supervisor mode access trigger |
| 19 | VAT | Virtual address trigger |
| 20 | STALL | Processor stall trigger |

320 brackets rows 16–20

FPU triggers
| | | |
|---|---|---|
| 21 | FPHLD | FPU pipeline hold trigger |
| 22 | FPQ | FPU Queue full trigger |

330 brackets rows 21–22

DMA triggers
| | | |
|---|---|---|
| 23 | DMAR | DMA request trigger |
| 24 | DMAT | DMA translate trigger |
| 25 | DMAW | DMA write trigger |

340 brackets rows 23–25

| 26 | CYC | Cycle count trigger |

Assertion control register

| reserved | Trigger Assertion Control | OR | L |
|---|---|---|---|
| 31       26 | 25                    02 | 01 | 00 |

When bit is asserted, INVERT trigger.

| Bit | Mnemonic | Function |
|---|---|---|
| 00 | | Reserved (read as zero). |
| 01 | | Reserved (read as zero). |

Cache assertions
| | | |
|---|---|---|
| 02 | IHLD | I-cache hold invert |
| 03 | IMSS | I-cache miss invert |
| 04 | ISTRM | I-cache stream invert |
| 05 | IFTCH | I-cache fetch (cache lookup) |
| 06 | DHLD | D-cache hold trigger |
| 07 | DMSS | D-cache miss trigger |
| 08 | DSTRM | D-cache stream trigger |
| 09 | DFTCH | D-cache fetch (cache lookup) |
| 10 | WBHLD | Write buffer hold trigger |

Memory triggers
| | | |
|---|---|---|
| 11 | MBSY | Memory interface busy trigger |
| 12 | ABSY | AFX interface busy trigger |
| 13 | MPAGE | Memory page mode access trigger |
| 14 | MPRCG | Memory precharge access trigger |
| 15 | MRMW | Memory Read/Modify/Write operation trigger |

System triggers
| | | |
|---|---|---|
| 16 | XLTE | MMU translation attempt trigger |
| 17 | SRTW | SPARC Ref. MMU tablewalk trigger |
| 18 | SUP | Supervisor mode access trigger |
| 19 | VAT | Virtual address trigger |
| 20 | STALL | Processor stall trigger |

FPU triggers
| | | |
|---|---|---|
| 21 | FPHLD | FPU pipeline hold trigger |
| 22 | FPQ | FPU Queue full trigger |

DMA triggers
| | | |
|---|---|---|
| 23 | DMAR | DMA request trigger |
| 24 | DMAT | DMA translate trigger |
| 25 | DMAW | DMA write trigger |

*Figure 4*

Virtual Address Select Reg

| reserved | Virtual Address Select |
|---|---|
| 31        16 | 15        00 |

| Bit | Mnemonic | Function |
|---|---|---|
| 00 | VA_EN | Enable Virtual Address compares (enable = 1) |

02:01    VA_SRC    Vitrual Address Source select:

| Value | Source |
|---|---|
| 00 | Instruction Cache Address |
| 01 | Data Cache Address (also write buffer) |
| 10 | DVMA Address (for I/O MMU functions) |
| 11 | Physical Adress |

04:03    VA_TYP    Virtual Address request type

| Value | Source |
|---|---|
| 00 | Disabled |
| 01 | Read (D$ miss, I$ miss or DVMA read) |
| 10 | Data Adress tablewalk (write buffer) |
| 11 | LDSTO or DVMA translate |

06:05    TW_SRC    Tablewalk source

| Value | Source |
|---|---|
| 00 | Disabled |
| 01 | Instruction Address tablewalk |
| 10 | Data Address tablewalk (write buffer) |
| 11 | DVMA Address tablewalk |

07    REQ_EN    Memory Request compare enable

11:08    MREQ    Memory request match field

| Value | Request Type |
|---|---|
| 0000 | - - - |
| 0001 | Read 8-bytes |
| 0010 | Read 16-bytes |
| 0011 | - - - |
| 0100 | Read 32-bytes |
| 0101 | - - - |
| 011x | - - - |
| 1000 | - - - |
| 1001 | Write 1-byte |
| 1010 | Write 2-bytes |
| 1011 | Write 4-bytes |
| 1100 | Write 8-bytes |
| 1101 | Write 16-bytes |
| 111x | - - - |

15:12                  Bus ID for DMA masters

*Figure 5a*

Virtual Address field enable decode

| T 31:24 | S 23:18 | R 17:14 | N 13 | M 12 | L 11 | K 10 | J 09 | I 08 | H 07 | G 06 | F 05 | E 04 | D 03 | C 02 | B 01 | A 00 |
|---|---|---|---|---|---|---|---|---|---|---|---|---|---|---|---|---|
| 16 | 15 | 14 | 13 | 12 | 11 | 10 | 9 | 8 | 7 | 6 | 5 | 4 | 3 | 2 | 1 | 0 |

*Figure 5b*

Virtual Address Compare register

| 0 |
|---|
| Virtual Address Compare value |
| 31 |

METHOD AND APPARATUS FOR PERFORMING ON-CHIP MEASUREMENT ON A COMPONENT

This is a continuation of application Ser. No. 08/142,505, filed Oct. 22, 1993, now abandoned.

BACKGROUND OF THE INVENTION

1. Field of the Invention

The present invention relates to the measurement of performance of computer systems. More particularly, the present invention relates to the measurement of performance of operation of high speed, highly integrated processors.

2. Art Background

There are many different methods for debugging systems as well as for measuring performance of computer systems. On a component level, logic analyzers are typically used to monitor activity at the pins of the component in order to generate some debug information and performance criteria that a designer can use. However, such performance criteria measured is limited by the information that can be gained at the pins of the component. Thus, as components have become more and more integrated, incorporating many different features and functions on a single chip, the utility of the logic analyzers for measuring performance and providing debug information has decreased. This is due to the fact that the information available at the pins does not convey all of the information needed to generate meaningful data.

Some integrated components contain performance counters which are used to generate a trap when a specific event occurs during operation of the component. However, the counters are typically very limited in the breadth of the events counted. These counters are hard-wired and provide unqualified information. When the occurrence of one event is detected, a trap is triggered and software accessed via the trap is used to analyze what triggered the trap and provide limited debug information. One drawback to this method is the software overhead involved, which in some instances detracts from the accuracy of the data measured.

In order to overcome some of the limitations of logic analyzers with respect to integrated components, an internal scan process may be used to perform a dump of the state of the component. Components designed in compliance with the JTAG (Joint Test Access Group) specification, IEEE 1149.1, enable a user or designer to examine the state of the component at any clock cycle in order to gain additional information regarding performance and debugging information. However, the system clock must be disabled prior to performing the scan. One way to determine when to perform a scan is by stopping the clock at each clock cycle. However, without specifically knowing when to stop the clock and what to look for, a designer will be overwhelmed by the amount of data provided by examining the state of the chip, particularly if the contents of the chip are reviewed at every clock Cycle. Therefore, it is desirable to be able to stop the clock at a specific clock cycle, as well as during the execution of a specific instruction.

Performance information may also be acquired through software operating on the processor. For example, performance measuring code may be executed to periodically read certain registers of the component to gain performance information. However, the processor overhead required to execute such code can affect the accuracy of the measurements. Furthermore, for debug purposes it is advantageous to be able to distinguish between processes and threads of a processes when debugging software or improving the performance of such software operating on the component. For example, it may be desirable to tune a compiler to generate code with improved performance during execution. In this instance, it is important to be able to measure specific code sequences, or well defined events, such that any overhead events are ignored.

SUMMARY OF THE INVENTION

The system of the present invention includes programmable logic to generate watchpoint traps which cause a branch to determined trap code and breakpoint signals which cause the stopping of the system clock. Furthermore, the system can measure system performance criteria. The logic is flexible and easy to program, but sophisticated in application to provide a variety of criteria that trigger on events which in turn increment the counters. In addition to measuring performance criteria, the design further includes combinatorial logic to provide further flexibility to generate watchpoint traps as well as breakpoint signals for hardware and software debugging and performance measurements.

In the preferred embodiment, the system includes two counters and trigger decode logic to increment the counters. Each counter is independently programmable to enable the user to determine such performance information as average latency, which is a combination of one counter counting the number of occurrences of a particular event and a second counter counting the duration of the events. For example the average cache miss latency may be determined by the first counter measuring the number of cache misses that occur, and the second counter measuring the duration of the cache misses. Both counters can be programmed to measure on edges or levels of signals. In addition, the triggers can be used in a cascaded structure, wherein the first counter is used to generate a trigger which may be further qualified by the second counter.

Using this implementation, a more flexible counting strategy is provided. Furthermore, by using the two counters in a cascaded fashion, the occurrence on one type of event can be used to monitor the occurrence of a second type of event in order to determine the occurrence of a combination of events. In addition, both watchpoint traps and breakpoint signals can be generated based upon the occurrence of a variety of events internal to the component and not easily accessible during execution by the user.

Each counter includes trigger decode logic comprising a programmable select register to identify those events which should be monitored for generating a trigger. Preferably, each bit corresponds to a different event which can be monitored to generate a trigger. Information regarding the occurrence of these events are input to the trigger select logic such that when the corresponding bit is set in the select register and the event occurs, a signal is generated, which may result in the generation of a trigger to increment the counter. Preferably, the signals indicative that a selected event has occurred are combined via a logical OR or logical AND gate tree to generate a combined result. Furthermore, it is preferred that the trigger logic includes user selected edge/level triggers such that the trigger is based upon the occurrence of a signal edge or signal level. Thus, if the edge mode is selected, a trigger signal is output every time there is a change in state from the previous to the current state. If the level select is used when the signal is in a predetermined state, a trigger output is generated. The highly configurable trigger decode logic outputs a trigger signal to the corresponding counter logic and causes the increment of the count value stored in a counter register of the counter.

To measure performance information, the counters can be used to maintain counts of specified events. The processor can then periodically read the state of the counters to gain the performance information. As the hardware counters perform the task of detecting and maintaining counts of events, the overhead incurred by reading the state of the counters is minimal.

In one embodiment, the counters are used to generate a watchpoint trap or breakpoint signal. The watchpoint trap causes a trap to occur in the system whereby execution branches to predetermined trap code to perform certain steps, e.g., notifying the user that a trap has occurred due to the occurrence of an event or events. The breakpoint signal causes the stopping of the system clock such that an internal scan can be performed to determine the state of the processor.

Preferably, the counter register preloaded with a negative value, e.g., 2's complement, of the count of a certain event to occur before generating an output signal, such as that used to generate a trap. Therefore, when the counter register overflows, the output signal is generated, which in turn triggers the resultant signal, such as the watchpoint trap signal or breakpoint signal. In one embodiment, logic is included to select at each clock cycle whether the counter is loaded with an incremented value based on receipt of a trigger from the trigger decode logic or is reloaded with the prior count value, indicating that a trigger signal was not received from the trigger decode logic in the prior clock cycle.

The overflow signal is output to watchpoint trigger logic which generates a trap signal synchronized to the pipeline to branch to corresponding watchpoint code to service the trap. Alternately, the overflow signal is used to generate a breakpoint signal to the dock controller of the component which then stops the clock and enables the user to run an internal debug scan, such as a JTAG scan, in order to determine the state of the component. Thus a highly flexible but sophisticated structure is provided for debug and performance measurement criteria on a highly integrated component.

BRIEF DESCRIPTION OF THE DRAWINGS

The objects, features and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, electrical structures and circuits are shown in block diagram form in order not to obscure the present invention unnecessarily.

Figure 1A:
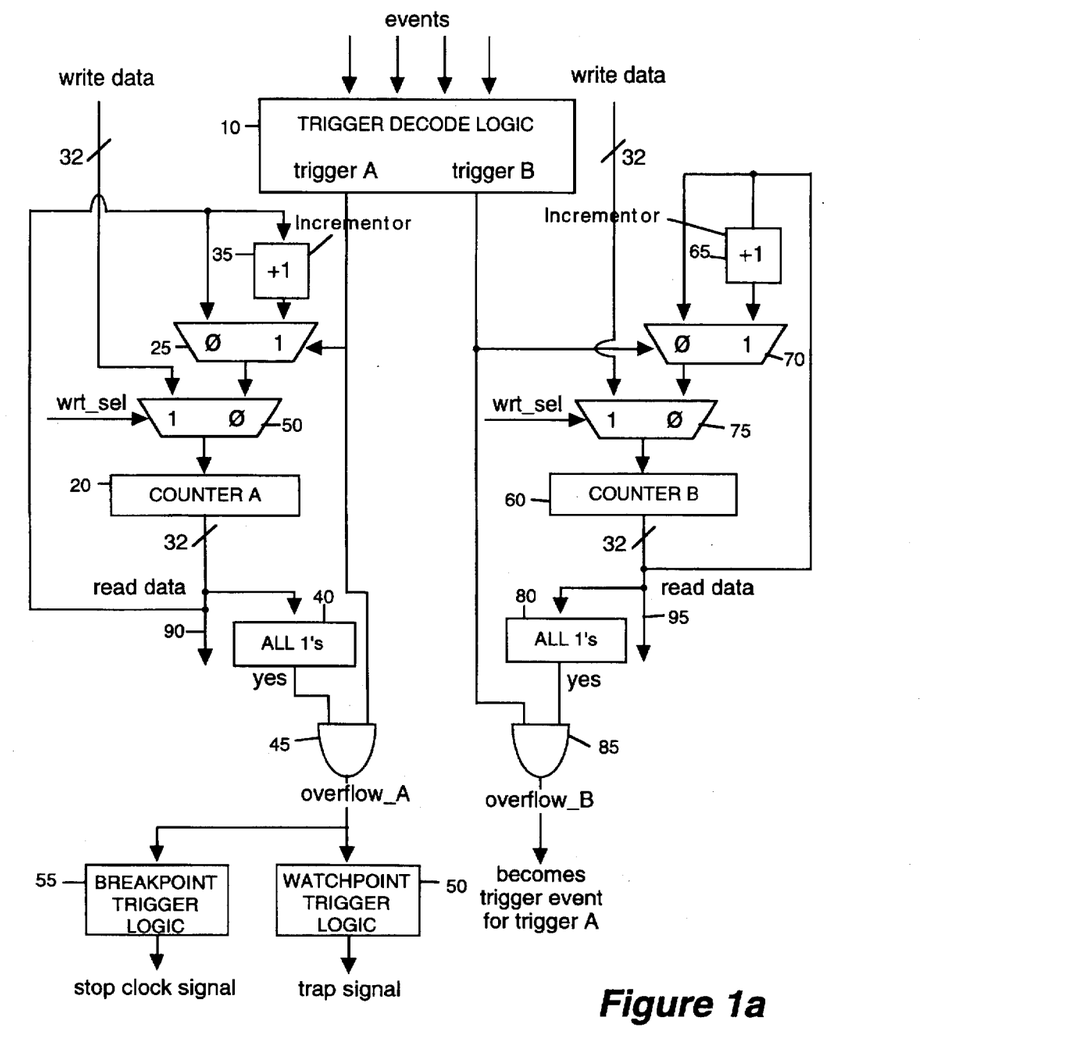
FIG. 1a is a block diagram illustration of the debug and performance monitoring logic of the present invention and FIG. 1b is a block diagram illustrating exemplary logic to operate the triggers in a cascade mode utilized in one embodiment of the present invention.

The system and method of the present invention provides a flexible and sophisticated counting mechanism for monitoring events which occur in a highly integrated electrical component, such as a processor component. A block diagram of one embodiment of the logic of the present invention is shown in FIG. 1a. Trigger decode logic 10 receives as input the events which may, depending upon the programmed state of the trigger decode logic, generate an output trigger to increment the values store in the counters registers 20, 60. In the present embodiment, the trigger decode logic includes logic to generate a first trigger, Trigger A, and a second trigger, Trigger B. As will be explained subsequently, these triggers can be used in combination with one another to provide average measurement as well as cascaded or dual measurements.

The counter logic further includes the counter A register 20 and a multiplexor 25, to select, based upon the trigger A input, whether the counter is to be updated with an incremented value, or be maintained at its current value. In order to determine when the counter register 20 has reached its counted value, it is preferred that the counter register 20 is initially loaded through write_select multiplexor 30 with a negative value (e.g., 2's complement) of the count that the register is to achieve prior to generating an output signal indicative of a certain state of the component. Thus, the output signal is simply an overflow of the counter register. This output signal is subsequently output to generate watchpoint triggers and breakpoint triggers for software and hardware debug processing.

To monitor events to generate a watchpoint trap or breakpoint signal, the counter register 20 is initially loaded with a 2's complement value of the count of an event to occur. The counter then monitors when the count of the event is finally reached, at which point an overflow condition occurs. Thus, in the present embodiment, logic detects whether the counter register 20 is updated with all 1's 40, indicative that at the next occurrence of a trigger output, an overflow condition will occur. This is determined by generation of a signal through AND gate 45. It is readily apparent to one skilled in the art that variations of the count logic may be implemented and still be within the spirit and cope of the present invention.

The present embodiment further shows watchpoint trigger logic 50 which receives the overflow signal from AND gate 45. This watchpoint trigger logic causes a watchpoint trap signal synchronized to the pipeline of the component to be generated at the current instruction. In the present embodiment, the watchpoint trap signal is output to the instruction unit of the processor which causes a branch of execution to the corresponding trap routine to service the trap. This is quite helpful in performing software debugs wherein the user can determine the specific instruction during which certain events occur. In the present embodiment, the watchpoint trigger logic is enabled by the processor, for example, by setting a predetermined bit in the main control register of the processor.

The present embodiment also includes selectable breakpoint trigger logic 55, wherein the output signal causes a breakpoint signal to be generated. This signal is output to the clock controller of the component which causes the clock in the component to stop, enabling an internal debug scan to be performed to examine the state of the component at the time of the occurrence of the events which trigger the signal. An exemplary scan includes the JTAG, IEEE 1149.1, IEEE Standard Test Access Port and Boundary Scan Architecture. Preferably, the breakpoint logic is enabled by performing an initializing scan, enabling the breakpoint logic, prior to processor operation. The scan is quite helpful for performing hardware debugging when certain events occur during certain clock cycles.

Alternately, the counters can be used to maintain counts of certain events which occur during operation of the component to provide performance information. In the present embodiment, the output of either counter register 20, 60 can be read through read_data line 90, 95 to provide a current count of certain events for performance measurements. For example, the counters may maintain an ongoing count of cache misses and the latency incurred due to the cache misses. Periodically, for example via a system timing or timeout function, this information can be read, for example, by the processor, to acquire the data needed to compute the measurement, for example, the average latency. As the counter hardware performs most of the overhead associated with acquiring the performance data, the software overhead is minimal.

As shown in FIG. 1a, the counter logic includes a counter B register 60 and corresponding select logic 65, 70, 75, 80, and 85 to provide similar functionality as described above with respect to the counter A register 20. In the present illustration, the overflow signal of counter register B 60, is used as a trigger event for counter A. Alternately, counter B can be used to acquire performance measurements or the overflow signal for counter B may be used to generate a signal which is input to watchpoint trigger logic 50 or breakpoint trigger logic 55. However, if counter B is selected to be a trigger for trigger A, then the two counters, counter A and counter B, can operate in a dual or cascaded fashion wherein, for example, counter A may describe an event that should trigger only after trigger B is already asserted.

Figure 1B:
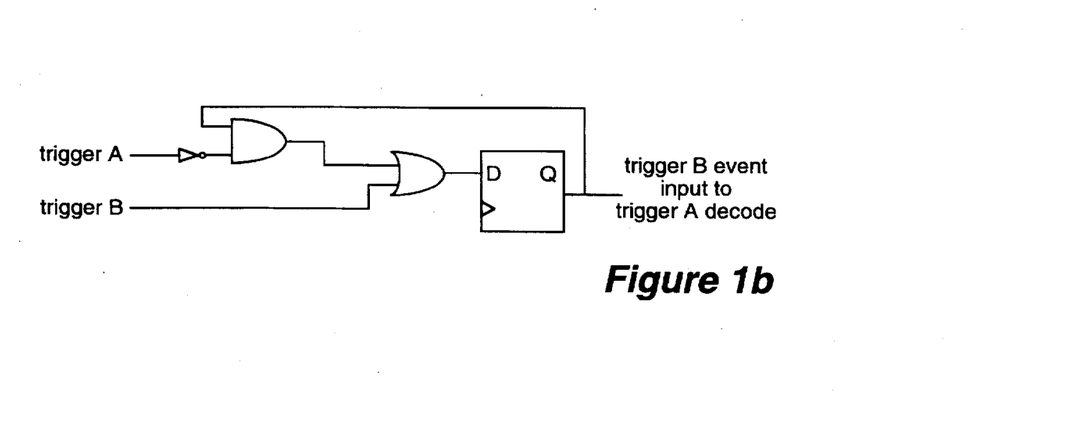

By cascading the two counters, the user is able to define a 2-stage sequence of events that cause either a watchpoint trap or breakpoint event. In this embodiment, additional logic is added to sustain the trigger B output, once it is asserted, until trigger A is asserted. An exemplary block diagram of the logic is shown in FIG. 1b. By sustaining the trigger B signal, the event described in the trigger A control register would include the trigger B event, and describe a second-stage event which will cause a further trigger. For example, trigger B may describe an event such as a store (write) to a specific virtual address, while trigger A may describe an instruction cache miss and trigger B. The trap for such an event would occur during the first instruction cache miss after the store to the specific virtual address. This results in a 2-stage or 2-level trigger.

Figure 2:
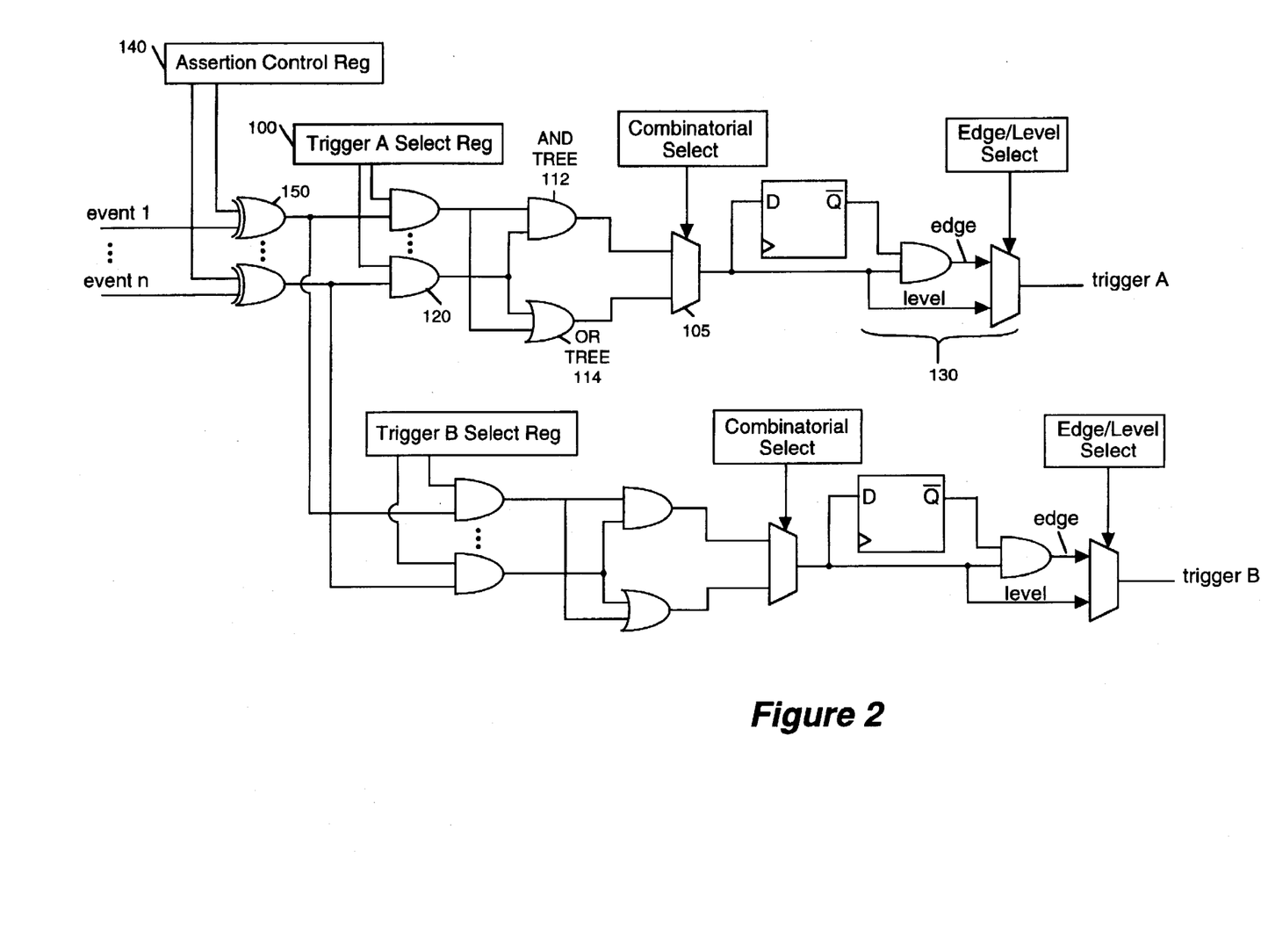
FIG. 2 is a block diagram illustrating the trigger decode logic utilized in the logic of the present invention.

The trigger decode logic 10 is shown in more detail in FIG. 2. In the present embodiment, the trigger decode logic includes a plurality of registers, one set of registers for trigger A and one set of registers for trigger B. This permits great flexibility in determining the events which will cause the triggers to increment the counter registers. For example, trigger A select register 100 is used to program the events which will cause trigger signals to occur with respect to trigger A and therefore counter A.

Figure 3A:
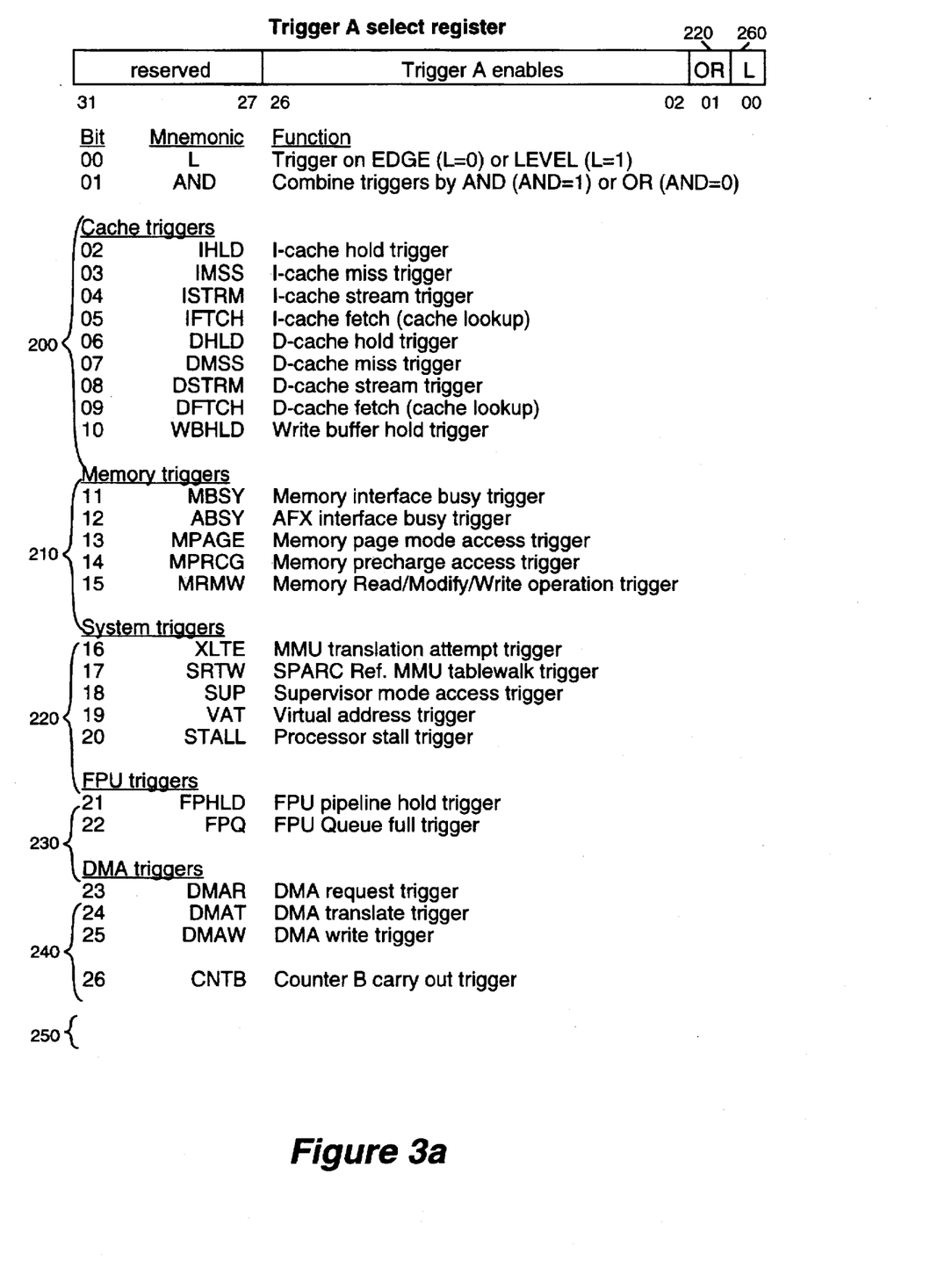
FIG. 3a sets forth an exemplary trigger A control register utilized by the trigger decode logic utilized in one embodiment of the present invention.

One embodiment of trigger A select register 100 is shown in FIG. 3a. It is readily apparent that this embodiment is exemplary and other forms of the trigger A select register may be used to include different events which may be used to cause the generation of a trigger signal. In the present embodiment, bits 2–26 are used to store the trigger A enable bits. As shown, the events that are monitored and that may generate a trigger signal when enabled pursuant to the trigger A select register, include cache triggers 200, memory triggers 210, system triggers 220, floating point unit triggers 230 and direct memory access triggers 240. Also included is an enable bit 250 for enabling the overflow of counter B to generate a trigger.

Figure 3B:
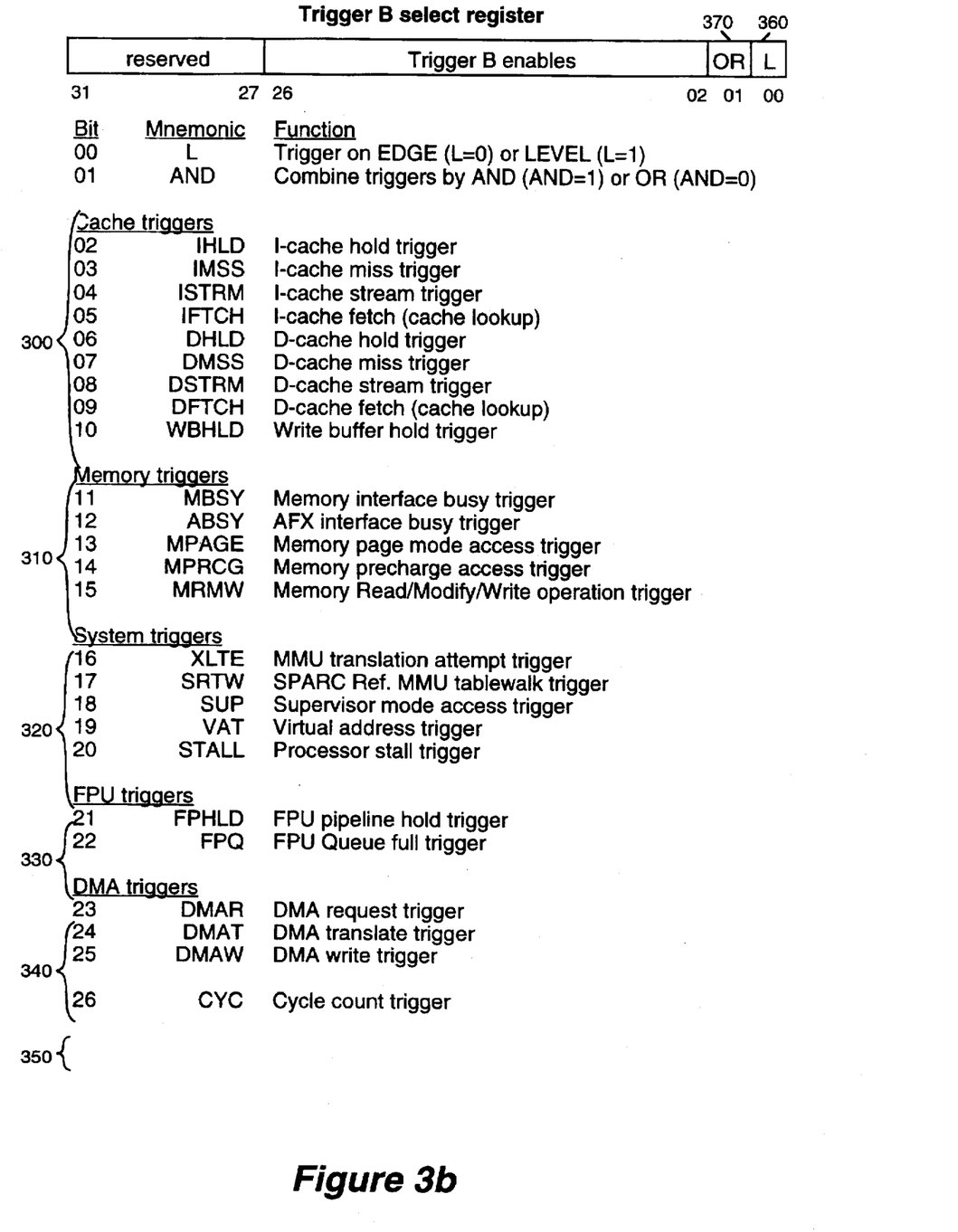
FIG. 3b illustrates an exemplary trigger B control register utilized by the control logic utilized in one embodiment of the present invention.

FIG. 3b sets forth the enable bits for the second counter, specifically the trigger B select register. The enable bits for events are quite similar to the ones set forth with respect to trigger A, in particular cache triggers 300, memory triggers 310, system triggers 320, floating point unit triggers 330 and DMA triggers 340. Also included is a cycle count trigger 350 which when selected, makes counter B a high resolution timer, based on the cycle time of the component. In other embodiments, it may be desirable to provide different event enable bits for other events not shown here. Furthermore, it may be desirable to vary the events enabled through the different trigger select registers.

As shown in FIGS. 3a and 3b, the trigger select registers include two additional control bits. The first bit, the L or level bit 260, 360, is used to indicate whether the trigger is generated based on an edge or a level signal. If set to indicate an edge select, a trigger output signal will be generated at the occurrence of each edge (rising or falling), that is when changes state of the signal input changes state, by the edge level select logic 130 (FIG. 2). If the bit is set to the second state, then the levels for a predetermined state, e.g. active state, are counted.

The second bit, OR bit 270, 370, is used to select whether the event signals are added together through a multi-input AND gate or AND tree 112 (FIG. 2) or a multiple input OR gate or OR tree logic 114 (FIG. 2). This provides a flexibility in controlling the state of the processor which triggers the incrementing of the counter value. For example, the occurrence of any one of a multiplicity of events may generate a trigger signal. Alternately, the occurrence of all enabled events generate a trigger signal.

Referring back to FIG. 2, the trigger select register 100 provides, in the present embodiment, one input to AND gate 120 into which a corresponding event signal is also input. Thus, if the enable bit is set and the corresponding particular event occurs, a signal is generated which is input into the AND tree/OR tree structure 112, 114 to generate a signal, which is then input into the edge/level select logic 130, to generate the trigger signal output to the counter logic (FIG. 1). Similar logic is also used to generate the trigger B signal.

Figure 4:
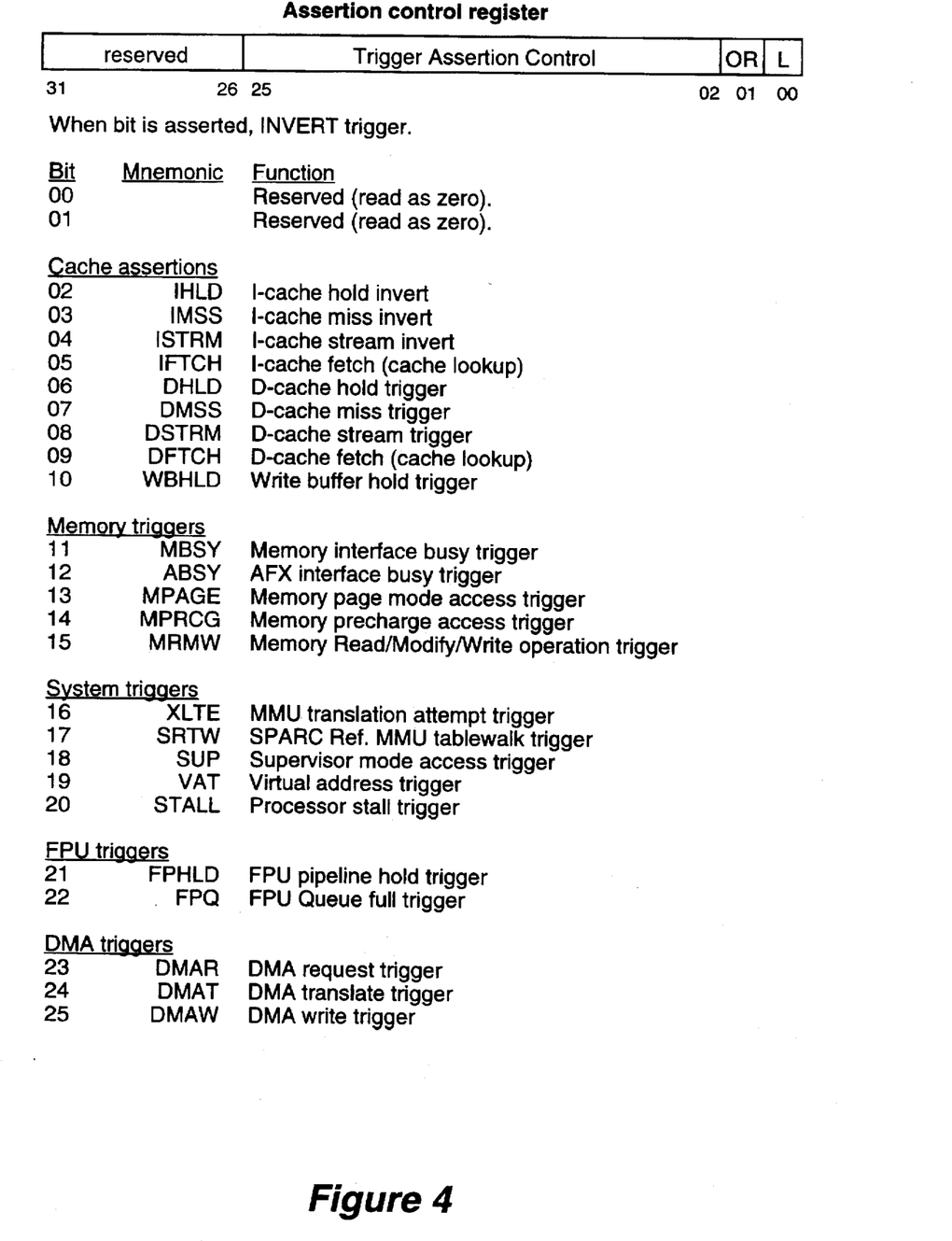
FIG. 4 illustrates the contents of the assertion control register utilized in one embodiment of the trigger control logic utilized in one embodiment of the present invention.

Also included in the present embodiment is assertion control register 140, an embodiment of which is illustrated in FIG. 4. The assertion control register is used to indicate the state of the event which causes a trigger signal. Thus, for example, when the bit is asserted, the trigger signal is inverted. Therefore the event may be due to the occurrence of a certain event or the non-occurrence of the event. This provides even further flexibility in programming the particular events that are to be monitored by the counter mechanism. Referring back to FIG. 2, in the present embodiment, the bits of the assertion control register 140 are input into exclusive OR gates 150. The second input to the gates 150 is the corresponding event. Thus, either the non-existence or the existence of a certain event will generate a signal in the trigger select logic.

In the present embodiment, the same assertion control register is used to control the events monitored by the trigger A select logic and the trigger B select logic. However, it is readily apparent that separate assertion control registers 140 may be used.

Figure 5A:
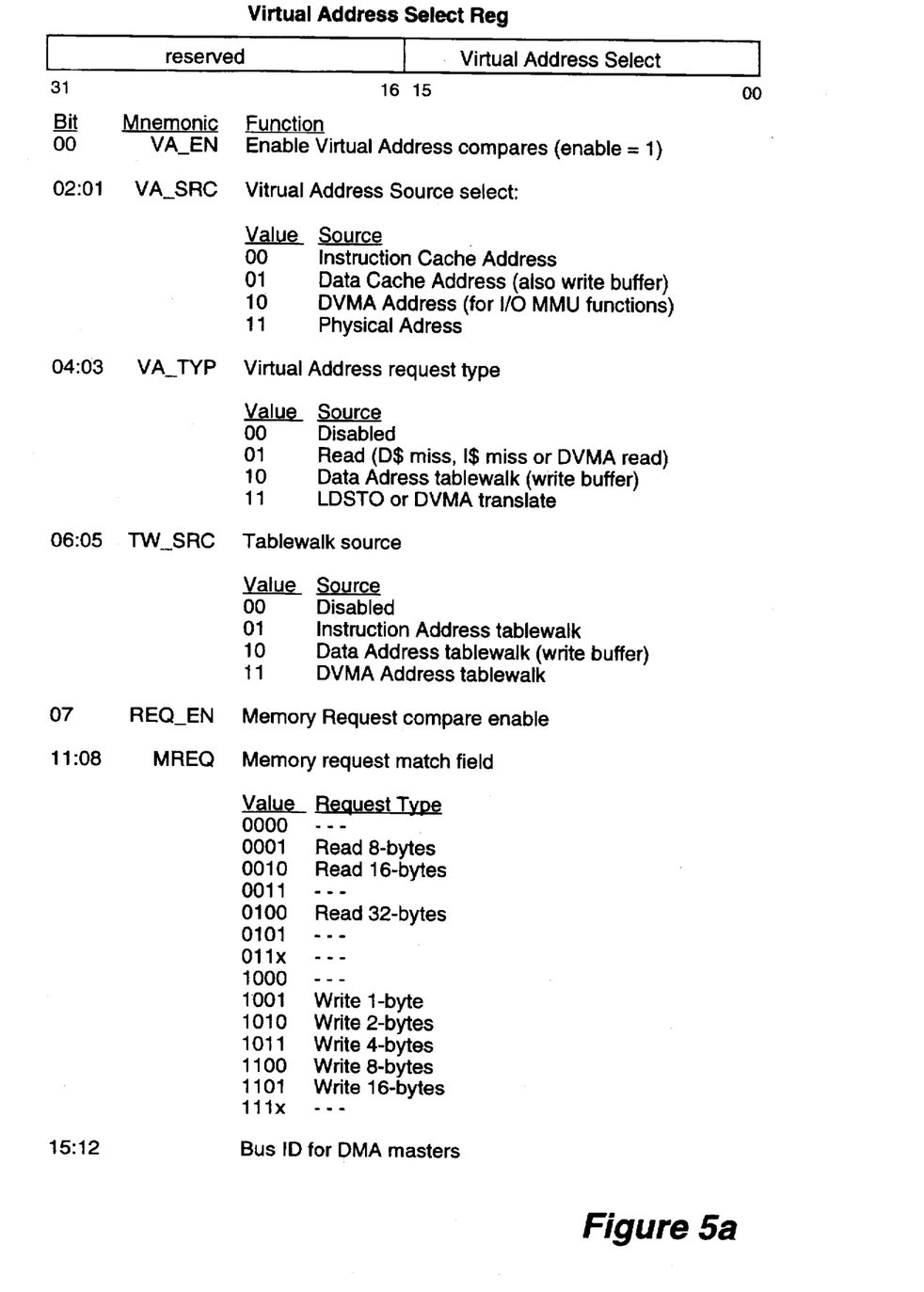
FIG. 5a illustrates the virtual address select register.
Figure 5B:
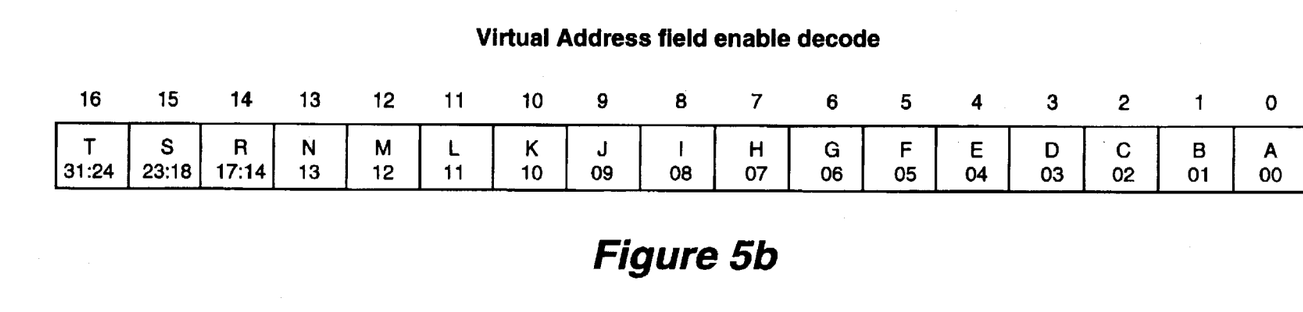
FIG. 5b illustrates the virtual address field enable decode and FIG. 5c illustrates the virtual address compare register utilized in one embodiment of the present invention.
Figure 5C:
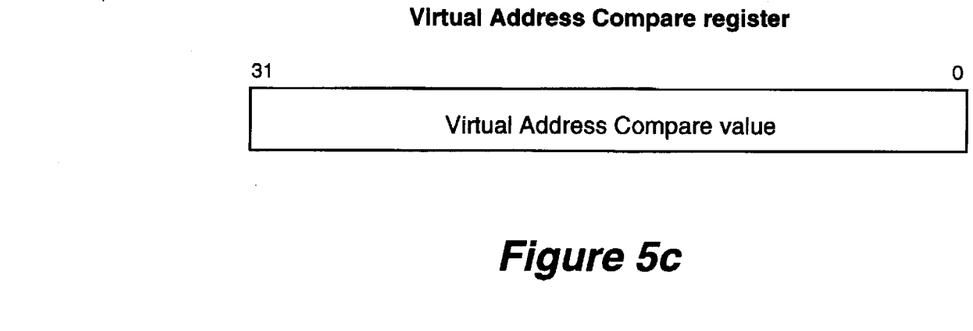

The present embodiment also includes virtual address select register, virtual address field enable decode register, and a virtual address compare register, as shown respectively in FIGS. 5a, 5b and 5c. These registers can be used to identify certain addresses which, alone or in conjunction with other events, will cause events/triggers to occur. The actual address on which a trigger may be programmed to occur is stored in the virtual address compare register shown in FIG. 5c. The virtual address field enable decode register, FIG. 5b, provides the user the flexibility for determining the resolution of the comparison to be performed to determine whether or not there is a register match for the compare address. Thus, by enabling the corresponding bits, resolution as specific as down to the precise address and as broad as within a region of memory may be used for the comparison by setting the appropriate bits in the register. The virtual address select register shown in FIG. 5a contains the enable bits used to identify the virtual address source, the virtual address request type, table walk source, and memory request type as well as I.D. type. Using the virtual address select register, the user can program specific addresses generated by specific sources which will generate a trigger, that becomes an event (see bit 19 of the trigger select register) that either trigger can use to further qualify events.

Figure 6:
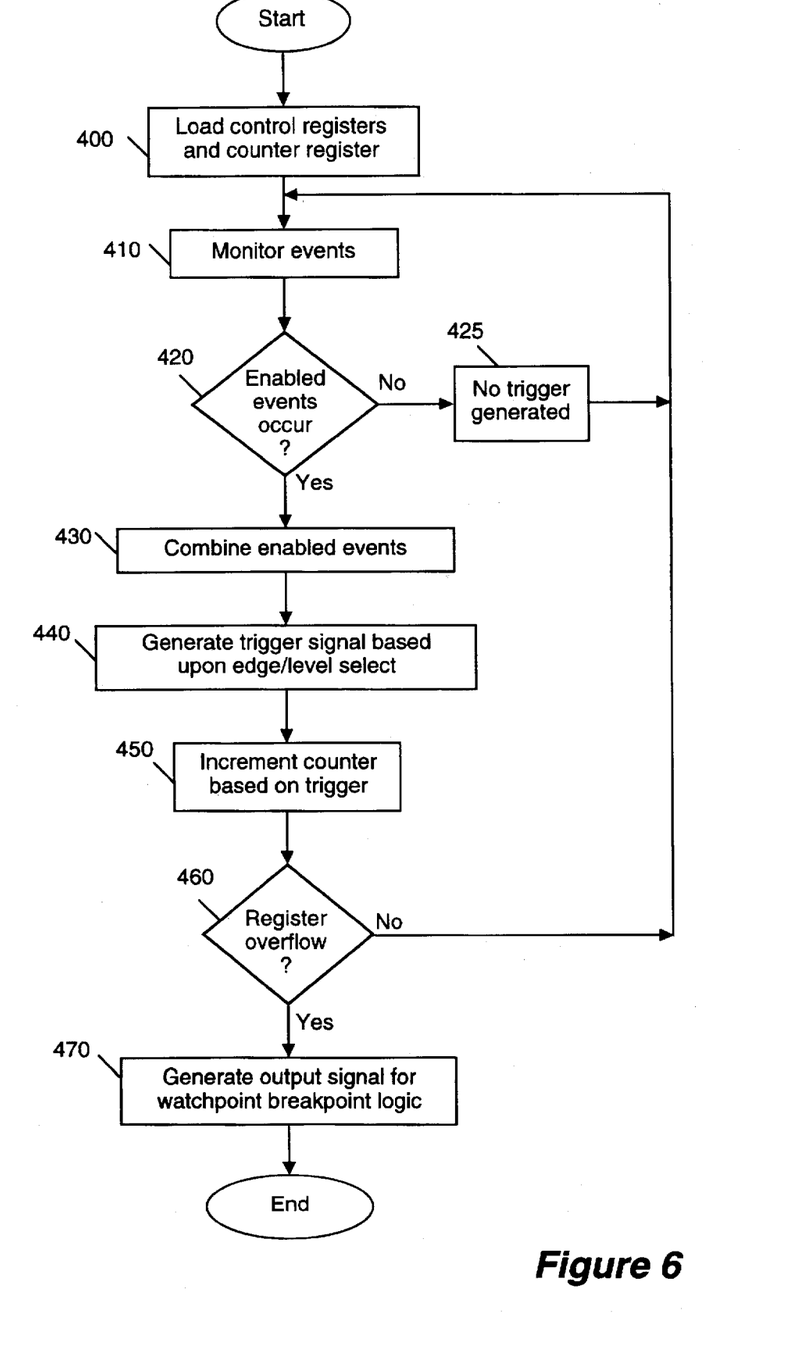
FIG. 6 is a flowchart illustrating one embodiment of the method of the present invention.

One embodiment of the method executed in accordance to the teachings of the present invention as illustrated in FIG. 6. At step 400, the control registers and counter registers are loaded with programmed values based upon the user's desired application of the counters. Once loaded, the component begins execution and the events are monitored by the trigger decode logic, step 410. If certain events occur and these events are enabled to be counted, step 420, then in accordance with the present embodiment, these enabled events are combined logically through an OR gate tree or AND gate tree, step 430 and are used to generate a trigger signal 440, based upon the edge level select. This trigger signal is then used to increment the counter, step 450. If the counter register overflows, step 460, then the output signal is generated, step 470, for input to, for example, the watchpoint or breakpoint logic, according to the user's desired programmed monitoring sequence. The events continue to be monitored, step 410, and the counter is incremented in this manner for a flexible technique for debugging a highly integrated component.

Alternately, a process can be implemented to periodically read the contents of the counters in order to acquire the data to generate performance measurements. In this application, the watchpoint and breakpoint logic is not enabled and overflow of the counters simply causes the counters to reset and continue counting from a reset value. Measurements may be taken in a variety of ways. For example, the count from the counter registers can be read prior to entering a specific code sequence/routine, and also when leaving that same routine. The difference between the values read reflects the measurement during the routine. Alternately, periodic readings of the counter registers can be taken, based on an interrupt generated by the system timer. These values would then be accumulated in main memory until the sequence or time-frame being measured is complete. The triggers can sufficiently define specific events or address ranges such unwanted occurrences are filtered out and not counted.

In view of the variety of events that can be monitored by the user using the same set of hardware, it is readily apparent that there are a large number of applications that may be implemented by the user. To illustrate, a few of those applications will be discussed herein. However, it is readily apparent that there is a variety of options available to the user simply by selecting certain combination of enables, edge level selects, combinatorial logic and use of the triggers alone or in combination with one another.

One example is the measurement of the instruction cache miss rate. The instruction cache (I-cache) miss rate measures the number of instruction cache misses per the number of instruction cache fetches. The instruction cache miss rate measurement uses both counter A and counter B to count two separate events.

To measure the I-cache miss rate, counter A is used to count the number of I-cache misses. Counter B is used to count the number of I-cache fetches. The performance control registers are therefore loaded with the following values (the values are presented here in hexadecimal).

| | |
|---|---|
| Trigger A select | 0000 0004. |
| Trigger B select | 0000 0020. |
| Assertion Control | 0000 0000. |
| Virtual Address Control | 0000 0000. |
| Virtual Address Mask | 0000 0000. |
| Virtual Address Compare | 0000 0000. |

To attain the instruction cache miss rates, the number of events counted in counter A is divided by the number of events counted in counter B.

The instruction cache miss rate trigger can be enhanced to reflect the miss rate for either supervisor mode fetches, user mode fetches, or both (control above is for both). To measure the I-cache miss rate for supervisor mode fetches, the supervisor mode bit is set in trigger A select and trigger B select registers, that is the registers are programmed with the value 0004 0004. To measure only the user code I-cache miss rate, the assertion control register is loaded with the value 0004 0000.

The control registers can also be programmed to determine the cache hit rate for a specific virtual address, or range of addresses using the virtual address select register and the virtual address compare register. For example, both trigger A select register and B select register are loaded with the value 0008 0004. The virtual address select register is loaded with the value 0000 0001. The virtual address field enable code and virtual address compare registers are loaded with values to describe a range or specific address on which to trigger.

Another performance measurement that can be performed is the measurement of the instruction cache average miss latency. The instruction cache average miss latency measures the duration of all instruction cache misses per the total number of instruction cache misses. The instruction cache (I-cache) average miss latency measurement uses both counter A and counter B to count the same event, but counter A records the number of cycles the I-cache miss signal asserts and counter B counts the number of times the I-cache signal is asserted. The values of the two counters can then be combined to determine the instruction cache average miss latency.

Therefore, to measure the I-cache average miss latency, counter A is used to count the number of cycles I-cache miss is asserted. Counter B is used to count the number of I-cache misses. The control registers are loaded with the following values:

| | |
|---|---|
| Trigger A Select | 0000 0017. |
| Trigger B Select | 0000 001e. |
| Assertion Control | 0000 0010. |
| Virtual Address Control | 0000 0000. |
| Virtual Address Mask | 0000 0000. |
| Virtual Address Compare | 0000 0000. |

To attain the instruction cache miss latency, the number of cycles counted in counter A is divided by the number of I-cache misses counted in counter B. The instruction cache miss latency trigger can also be enhanced to reflect the miss latencies for either supervisor mode fetches, user mode fetches or both (control above is for both). The trigger can also be used to determine the average I-cache latency for a specific virtual address, or range of addresses.

The present invention can also be used to measure the instruction cache miss memory latency. The instruction cache miss memory latency measures the total number of cycles it takes all I-cache misses to return an instruction from memory once the translation has been completed. This number is then divided by the total number of instruction cache misses. The instruction cache miss memory latency measurement uses both counter A and counter B to count the same event; counter A records the number of cycles the I-cache is waiting for data and counter B counts the number of times the I-cache waits for data. The values of the two counters can then be combined to determine the instruction cache miss memory latency.

Therefore, to measure the I-cache miss memory latency, counter A is used to count the number of cycles the I-cache miss waits for data. Counter B is used to count the number of I-cache misses. The control registers are therefore loaded with the following values:

| | |
|---|---|
| Trigger A Select | 0000 001f. |
| Trigger B Select | 0000 001e. |
| Assertion Control | 0000 0018. |
| Virtual Address Control | 0000 0000. |
| Virtual Address Mask | 0000 0000. |
| Virtual Address Compare | 0000 0000. |

To attain the instruction cache miss memory latency, the number of cycles counted by counter A is combined with the number of events counted by counter B. The combined value is then divided by the number of I-cache misses counted by counter B.

Furthermore, the present invention may be used to measure the instruction cache miss translation latency. The instruction cache miss translation latency measures the total number of I-cache tablewalk cycles during the I-cache translation phase. This number is divided by the total number of instruction cache misses. The instruction cache miss translation latency measurement uses both counter A and counter B to count the same event. Counter A records the number of cycles of the I-cache tablewalks and counter 13 counts the number of times the I-cache misses. The values of the two counters are combined to determine the instruction cache miss latency due to I-cache translation look aside buffer (TLB) misses.

To measure the I-cache miss translation latency, counter A is used to count the number of cycles I-cache miss waits before issuing a memory request. Counter B is used to count the number of I-cache misses. The control registers are therefore loaded with the following values:

| | |
|---|---|
| Trigger A Select | 0008 000b. |
| Trigger B Select | 0000 0008. |
| Assertion Control | 0000 0000. |
| Virtual Address Control | 0000 0021. |
| Virtual Address Mask | 0001 ffff. |
| Virtual Address Compare | 0000 0000. |

To attain the average instruction cache miss translation latency due to I-cache TLB misses, the number of cycles in counter A is divided by the number of I-cache misses counted in counter B. Other determinations are also possible. For example, to calculate the I-cache TLB hit rate, trigger A select register is programmed with the value 0008 000a. To determine the average latency per I-cache tablewalk, trigger B select register is programmed with the value 0008 000a.

Pipeline stalls due to floating point (FP) holds can also be measured using the counters of the present invention. The pipeline stalls due to floating point holds measures both the total number of cycles the pipeline has stalled and also the number of cycles the floating point unit (FPU) is holding the pipe. This produces the percentage of pipeline stalls that the FPU contributes. To measure the pipeline stalls due to FP holds, counter A is therefore used to count the number of cycles FP hold signal is asserted. Counter B is used to count the number of pipeline stalls. The control registers are loaded with the following values:

| | |
|---|---|
| Trigger A Select | 0020 0445. |
| Trigger B Select | 0010 0001. |
| Assertion Control | 0020 0444. |
| Virtual Address Control | 0000 0000. |
| Virtual Address Mask | 0000 0000. |
| Virtual Address Compare | 0000 0000. |

To attain the percentage of FP holds with respect to the total number of pipeline stalls, the number of cycles counted in counter A is divided by the number of data cache misses counted in counter B.

This measurement can be enhanced to reflect the number of stalls for either supervisor mode, user mode or both (control above is for both). This measurement can also be enhanced to only record those events that occur when executing instructions from within a given address range which would provide the ability to measure the performance of specific routine with respect to this trigger.

Another example of the kind of measurements that can be performed is the floating point queue latency. The floating point queue full latency is measured according to the total number of FP queue full cycles, and also the number FP queue full assertions. This produces the average latency per floating point queue full. To measure the floating point queue full latency, counter A is used to count the number of cycles FP queue full signal is asserted. Counter B is used to count the number of FP queue full assertions. The control registers are therefore loaded with the following values:

| | |
|---|---|
| Trigger A Select | 0040 0001. |
| Trigger B Select | 0040 0000. |
| Assertion Control | 0000 0000. |
| Virtual Address Control | 0000 0000. |
| Virtual Address Mask | 0000 0000. |
| Virtual Address Compare | 0000 0000. |

To attain the average floating point queue full latency, the number of cycles counted in counter A is divided by the number of FP queue full assertions counted in counter B.

The system of the present invention is not limited to the above examples. Numerous other measurements can be performed by manipulation of the control registers. For example, such measurements as, DVMA read translation latency, DVMA sub-word write rate, DVMA TLB miss rate, instruction cache streaming hit rate, floating point hold latency, processor tablewalk latency, write buffer full latency, data cache contention latency, data cache miss latency, data cache miss rate, instruction cache contention latency and instruction cache miss translation latency can also be determined.

The invention has been described in conjunction with a preferred embodiment. It is readily apparent that numerous alternatives, modification, variations and uses will be apparent to those skilled in the art in light of the foregoing description.

What is claimed is:

1. In an integrated component located on a chip, said integrated component comprising a processor and an apparatus for detecting events which occur on the integrated component, said apparatus for detecting events comprising:

trigger decode logic comprising;

a plurality of inputs for receiving signals indicative of occurrences of events, and a first event select register comprising data which identifies selectively events to generate a first output trigger signal, said trigger decode logic outputting a first output trigger signal when at least one event identified by the first event select register occurs;

counter logic for counting a number of output trigger signals generated comprising;

an input coupled to receive the first output trigger signal, and a count incrementor for selectively incrementing a first count for each first output trigger signal received.

2. The apparatus as set forth in claim 1, wherein said counter logic further comprises an output signal generator for generating an event signal when the first count reaches a predetermined value.

3. The apparatus as set forth in claim 2, wherein said count incrementor comprises a first counter register for storing a current first count and said output signal generator generates an event signal when the first count overflows the first counter register.

4. The apparatus as set forth in claim 3, wherein said counter logic further comprises a count load input for loading the first counter register with a predetermined count such that an event signal is generated when a programmed count of triggers occurs.

5. The apparatus as set forth in claim 2, wherein said counter logic is programmable such that an event signal is generated when a programmed count of triggers occurs.

6. The apparatus as set forth in claim 2, further comprising watchpoint trigger logic coupled to receive the event signal for generating a trap to the processor on an instruction boundary.

7. The apparatus as set forth in claim 2, further comprising breakpoint trigger logic coupled to receive the event signal for generating a breakpoint to stop the processor on a clock cycle boundary.

8. The apparatus as set forth in claim 2, further comprising scan logic for performing a scan of a state of the integrated component when the event signal is generated.

9. The apparatus as set forth in claim 1, wherein said count incrementor further comprises a first multiplexer which receives as a first input a current first count stored in a first counter register and as a second input the current first count incremented by one, and outputs a value selected by the first output trigger signal to be stored in the first counter register, such that if the first output trigger signal is in a first state indicative that an event occurred, the value output and stored in the first counter register is the current first count incremented by one, and if the first output trigger signal is in a second state indicative that an event has not occurred, the value output and stored in the first counter register is the current first count.

10. The apparatus as set forth in claim 9, wherein said first multiplexer generates an output value every clock cycle.

11. The apparatus as set forth in claim 1, the counter logic further comprising a count output from which the first count located in the counter logic are read, said processor further comprising logic to read the count output to gain performance information.

12. The apparatus as set forth in claim 1, wherein said trigger decode logic further comprises:

a level detector for detecting duration of at least one event;

an edge detector for detecting the occurrences of at least one event; and an edge/level select for selecting the first output trigger signal to be selectively responsive to an occurrence of at least one event or to a duration of at least one event.

13. The apparatus as set forth in claim 12, wherein said first event select register further comprises a bit to be used by the edge/level select to select an edge or level detect.

14. The apparatus as set forth in claim 1, wherein said trigger decode logic further comprises:

AND gate logic coupled to receive as input signals identifying each selected event that occurs, said AND gate logic performing a logical AND of the input signals to generate the first output trigger signal;

OR gate logic coupled to receive as input signals identifying each selected event that occurs, said OR gate logic performing a logical OR of the input signals to generate the first output trigger signal; and a combinatorial logic selector for selecting the OR gate logic or the AND gate logic.

15. The apparatus as set forth in claim 14, wherein said first event select register further comprises a bit used by the combinatorial logic selector for selecting the OR gate logic or the AND gate logic.

16. The apparatus as set forth in claim 1, wherein said trigger decode logic further comprises a second event select register comprising data which identifies selectively events to generate a second trigger signal, said trigger decode logic outputting a second output trigger signal when at least one event identified by the second event select register occurs;

said counter logic further comprising a second count incrementor for selectively incrementing a second count for each second output trigger signal received.

17. The apparatus as set forth in claim 16, wherein said trigger decode logic further comprises a second event select register comprising data which identifies selectively events to generate a second trigger signal, said trigger decode logic outputting a second output trigger signal when at least one event identified by the second event select register occurs;

said counter logic further comprising a second count incrementor for selectively incrementing a second count for each second output trigger signal received; and said counter logic further comprising trigger combination logic for selectively generating the event signal when the first count and second count reach predetermined values.

18. The apparatus as set forth in claim 17, wherein:

said trigger combination logic comprises providing an input event signal to the first trigger decode logic when the second count reaches a determined value;

such that a cascaded count of events to generate the event signal is performed.

19. The apparatus as set forth in claim 18, further comprising logic to hold the input event signal indicative that the second count reached a determined value such that a first output trigger signal is generated for multiple clock cycles after an initial generation of the input event signal indicative that the second count reached a determined value.

20. The apparatus as set forth in claim 17, wherein said trigger combination logic comprises count selector for selecting the first count and second count to use to generate the event signal.

21. The apparatus as set forth in claim 16, wherein the counter logic further comprises a first and second count output from which the first and second count of events stored in the counter logic are read, said processor further comprising logic to read the first count and second count output to gain performance information.

22. The apparatus as set forth in claim 21, said processor combining the first count and second count to determine specific performance information.

23. In an integrated component located on a chip, said integrated component comprising a processor and an apparatus for detecting events which occur on the integrated component, said apparatus for detecting events comprising:

trigger decode logic comprising;
a plurality of inputs for receiving signals indicative of occurrences of events, and
a first event select register comprising data which identifies selectively events to generate a first output trigger signal, said trigger decode logic outputting the first output trigger signal when at least one event identified by the first event select register occurs,
a first level detector for detecting a duration of at least one event,
a first edge detector for detecting the occurrences of at least one event, and
a first edge/level select for selecting the first output trigger signal to be selectively responsive to an occurrence of at least one event or to a duration of at least one event; and counter logic for counting a number of first output trigger signals generated comprising;
an input coupled to receive the first output trigger signal, and
a count incrementor for selectively incrementing a first count for each first output trigger signal received.

24. The apparatus as set forth in claim 23, wherein said counter logic further comprises an output signal generator for generating an event signal when the first count reaches a predetermined value.

25. The apparatus as set forth in claim 23, wherein said trigger decode logic further comprises;

a second event select register comprising data which identifies selectively events to generate a second trigger signal, said trigger decode logic outputting a second output trigger signal when at least one event identified by the second event select register occurs,
a second level detector for detecting the duration of at least one event,
a second edge detector for detecting the occurrences of at least one event, and
a second edge/level select for selecting the second output trigger signal to be selectively responsive to an occurrence of at least one event or to a duration of at least one event; and said counter logic further comprising a second counter incrementor for selectively incrementing a second count for each second output trigger signal received.

26. The apparatus as set forth in claim 25, said counter logic further comprising trigger combination logic for selectively generating art event signal when the first count and second countreach predetermined values.

27. The apparatus as set forth in claim 26, wherein:

said trigger combination logic comprises providing an input event signal to the trigger decode logic when the second count reaches a determined value;

such that a cascaded count of events to generate the event signal is performed.

28. The apparatus as set forth in claim 27, further comprising logic to hold the input event signal indicative that the second count reached a determined value such that a first output trigger signal is generated for multiple clock cycles after an initial generation of the input event signal indicative that the second count reached a determined value.

29. The apparatus as set forth in claim 25, wherein the counter logic further comprises a first and second count output from which the first and second count of events stored m the counter logic are read, said processor further comprising logic to read the first count and second count output to gain performance information.

30. The apparatus as set forth in claim 29, said processor combining the first count and second count to determine an average occurrence of at least one event.

31. The apparatus as set forth in claim 29, said processor combining the first count and second count to determine an average duration of at least one event.

32. In an integrated component comprising a processor, said integrated component located on a chip a method executed on the integrated component for detecting events which occur on the integrated component comprising the step of:

receiving signals indicative of occurrences of events;
selectively identifying events to generate a first output trigger signal when a selected event occurs;
outputting a first output trigger signal when at least one event selectively identified occurs;
generating a first count of a number of output trigger signals generated;
storing the first count in a first counter register; and
generating an event signal when the first count overflows the first counter register.

33. The method as set forth in claim 32, further comprising the step of programming the first count such that an event signal is generated when a programmed count occurs.

34. The method as set forth in claim 32, further comprising the step of loading a predetermined count into the first counter register such that an event signal is generated when a programmed count of triggers occurs.

35. The method as set forth in claim 32, further comprising the step of selectively logically ANDing or logically ORing signal identifying each selected event that occurs.

36. The method as set forth in claim 32, further comprising the steps of:

selectively identifying events to generate a second trigger signal;

outputting a second output trigger signal when at least one identified event occurs;

incrementing a second count for each second output trigger signal received; and selectively generating the event signal when the first count and second countreach predetermined values.

37. The method as set forth in claim 36, furrier comprising the step of providing an input event signal to generate a first trigger signal when the second count reaches a determined value such that a cascaded count of events to generate the event signal is performed.

38. The method as set forth in claim 37, further comprising the step of holding the input event signal indicative that the second count reached a determined value such that a first output trigger signal is generated for multiple clock cycles after an initial generation of the input event signal indicative that the second count reached a determined value.

39. The method as set forth in claim 38, further comprising the step of combining the first count and second count to determine specific performance information.

40. In an integrated component comprising a processor, said integrated component located on a chip, a method executed on the integrated component for detecting events which occur on the integrated component comprising the steps of:

receiving signals indicative of occurrences of events;

selectively identifying events to generate a first output trigger signal when a selected event occurs;

outputting a first output trigger signal when at least one event selectively identified occurs;

generating a first count of a number of output trigger signals generated;

generating an event signal to the processor when the first count reaches a predetermined value.

41. The method as set forth in claim 40, further comprising the step of generating a trap to the processor on an instruction boundary upon generation of the event signal.

42. The method as set forth in claim 40, further comprising the step of generating a breakpoint to stop the processor on a dock cycle boundary when the event signal is generated.

43. The method as set forth in claim 42, further comprising the step of performing a scan of a state of the integrated component when a clock is stopped.

44. In an integrated component comprising a processor, said integrated component located on a chip, a method executed on the integrated component for detecting events which occur on the integrated component comprising the steps of:

receiving signals indicative of occurrences of events;

selectively identifying events to generate a first output trigger signal when a selected event occurs;

outputting a first ought trigger signal when at least one event selectively identified occurs;

generating a first count of a number of output trigger signals generated;

reading the first count to determine performance information.

45. The method as set forth in claim 44, wherein the step of reading the first count is performed periodically by the processor to determine performance information.

46. In an integrated component comprising a processor, said integrated component located on a chip, a method executed on the integrated component for detecting events which occur on the integrated component comprising the steps of:

receiving signals indicative of occurrences of events;

selectively identifying events to generate a first output trigger signal when a selected event occurs;

detecting a duration of at least one event;

detecting an occurrence of at least one event and selecting the first output trigger signal to be selectively responsive to an occurrence of at least one event or to a duration of at least one event.

* * * * *